United States Patent
Denny et al.

(10) Patent No.: US 7,949,486 B2
(45) Date of Patent: May 24, 2011

(54) METHOD AND APPARATUS FOR CALIBRATING AN IMAGE CAPTURING DEVICE, AND A METHOD AND APPARATUS FOR OUTPUTTING IMAGE FRAMES FROM SEQUENTIALLY CAPTURED IMAGE FRAMES WITH COMPENSATION FOR IMAGE CAPTURE DEVICE OFFSET

(75) Inventors: Patrick Eoghan Denny, Galway (IE); Tycho Lorenz Roland Raab, München (DE); Lloyd Anthony Sharman, Bohola (IE)

(73) Assignee: Hi-Key Limited, Tuam (IE)

( * ) Notice: Subject to any disclaimer, the term of this patent is extended or adjusted under 35 U.S.C. 154(b) by 109 days.

(21) Appl. No.: 12/091,636

(22) PCT Filed: Oct. 31, 2006

(86) PCT No.: PCT/IE2006/000125
§ 371 (c)(1),
(2), (4) Date: Feb. 4, 2009

(87) PCT Pub. No.: WO2007/049266
PCT Pub. Date: May 3, 2007

(65) Prior Publication Data
US 2009/0179773 A1  Jul. 16, 2009

(30) Foreign Application Priority Data
Oct. 28, 2005  (IE) .................................. S2005/0726

(51) Int. Cl.
*G06F 19/00* (2011.01)
*G06K 9/36* (2006.01)
*H04N 5/228* (2006.01)

(52) U.S. Cl. .................. 702/94; 382/291; 348/208.5
(58) Field of Classification Search ................ 702/94; 348/144, 187, 219.1, 208.5; 382/276, 295, 382/309, 291
See application file for complete search history.

(56) References Cited

U.S. PATENT DOCUMENTS

| | | | |
|---|---|---|---|
| 5,675,489 A | 10/1997 | Pomerleau | |
| 6,760,471 B1 * | 7/2004 | Raymond | 382/147 |
| 7,420,592 B2 * | 9/2008 | Freeman | 348/219.1 |

OTHER PUBLICATIONS

Patent Abstracts of Japan—JP2003 329439 dated Nov. 19, 2003.
Patent Abstracts of Japan—JP2005 039599 dated Feb. 10, 2005.
Patent Abstracts of Japan—JP2003 087781 dated Mar. 20, 2003.

* cited by examiner

*Primary Examiner* — Bryan Bui
(74) *Attorney, Agent, or Firm* — Sughrue Mion, PLLC

(57) ABSTRACT

A camera (17) mounted on a rear view mirror housing (5) of a vehicle (1), which captures a plan view image of the ground on one side of the vehicle for display on an in-vehicle visual display unit (13) is calibrated to correct for offset of the camera (17) from an ideal position. During calibration an image of a reference point (34) on the vehicle (1) is captured as the mirror housing (5) is swiveled from a rest position to an operative position. The offset of the actual position of the image of the reference point in the captured image from its ideal position is computed, and a look-up table is prepared, which indicates the position at which pixels of subsequently captured image frames should be located to produce image frames with offset correction.

25 Claims, 7 Drawing Sheets

| 1 | 2 | 3 | 4 |
|---|---|---|---|
| $X_n$ | $Y_n$ | $X_{cn}$ | $Y_{cn}$ |
| 0 | 1 | | |
| 1 | 1 | | |
| 2 | 1 | | |
| 3 | 1 | | |
| ⋮ | ⋮ | | |
| 0 | 2 | | |
| 1 | 2 | | |
| 2 | 2 | | |
| 3 | 2 | | |
| 4 | 2 | | |
| ⋮ | ⋮ | | |
| 0 | 3 | | |
| 1 | 3 | | |
| 2 | 3 | | |
| ⋮ | ⋮ | | |

Fig. 9

METHOD AND APPARATUS FOR CALIBRATING AN IMAGE CAPTURING DEVICE, AND A METHOD AND APPARATUS FOR OUTPUTTING IMAGE FRAMES FROM SEQUENTIALLY CAPTURED IMAGE FRAMES WITH COMPENSATION FOR IMAGE CAPTURE DEVICE OFFSET

FIELD OF THE INVENTION

The present invention relates to a method and a calibration system for calibrating an output of an image capture device, of the type typically mounted on a motor vehicle to compensate for offset of the image capture device from an ideal position. The invention also relates to a method and an image vision system for producing an output image frame from a captured image frame captured by an image capture device with the output image frame with compensation for offset of the image capture device from an ideal position. The invention also relates to a vehicle comprising a calibration system for calibrating an output of an image capture device mounted on the vehicle to compensate for offset of the image capture device from an ideal position, and the invention further relates to a vehicle comprising an image capture device mounted thereon and an associated image vision system for producing an output image frame from a captured image frame captured by the image capture device with the output image frame with compensation for offset of the image capture device from an ideal position.

BACKGROUND OF THE INVENTION

It is known to mount image capture devices, such as, for example, digital or analogue video cameras, on a motor vehicle in order to produce a video image of an aspect of the environment exterior of the vehicle. For example, in order to assist in parking and manoeuvring a vehicle in confined spaces, it is known to mount such image capturing devices on respective opposite sides of the vehicle, for example, on side rear view mirror housings which extend sidewardly from the driver and front passenger doors of the vehicle. The image capture devices are mounted in the side rear view mirror housings with the field of view of the image capture devices directed downwardly towards the ground for capturing plan view images of the ground on respective opposite sides of the vehicle adjacent the vehicle. Typically, a visual display unit is located in the vehicle, either in or on the dashboard, or in a location corresponding to that of a conventional interiorly mounted rear view mirror. When a driver is undertaking a parking manoeuvre or a manoeuvre in a confined space, a plan view image of the vehicle with the respective plan view images of the ground on respective opposite sides of the vehicle can be displayed on the visual display unit. The plan view display of the vehicle and the ground on respective opposite sides of the vehicle assists the driver in parking, and in particular, carrying out a parking manoeuvre for parking the vehicle in a parking space parallel to a kerb of a footpath or the like.

However, in order that the plan view images of the ground accurately reflect the positions of objects relative to the vehicle, which are captured in the images, it is essential that the plan view images of the ground juxtapositioned with the plan view image of the vehicle should accurately represent a top plan view of the ground adjacent the respective opposite sides of the vehicle exactly as would be seen when viewed from above. In other words, the edges of the respective plan view images of the ground which extend along the sides of the plan view image of the vehicle must correspond directly with the edge of the ground along the sides of the vehicle when viewed in plan view from a position above the vehicle. Otherwise, the positions of objects in the respective plan view images of the ground will not be accurately positioned relative to the vehicle. For example, if the edge of one of the plan view images of the ground adjacent the corresponding side of the plan view image of the vehicle corresponds with a portion of a plan view of the ground which is spaced apart from the side of the vehicle, then the positions of objects in the plan view image of the ground will appear closer to the vehicle in the image than they actually are. Conversely, if one of the image capture devices is mounted on a side mirror housing so that an image of a portion of the ground beneath a side of the vehicle is captured, the positions of objects captured in the plan view image will appear farther away from the vehicle than they actually are, with disastrous results, particularly if a driver is parking the vehicle parallel to a wall or bollards.

Accordingly, it is essential that the plan view images of the ground when displayed on the visual display screen juxtapositioned along with the plan view image of the vehicle must be representative of plan views of the ground on respective opposite sides of the vehicle exactly as would be seen from a top plan view of the vehicle and adjacent ground. In order to achieve such accuracy, the image capture devices would have to be precision mounted on the vehicle. In practice this is not possible.

Accordingly, in order to achieve the appropriate degree of exactness and accuracy of the plan view images of the ground relative to the plan view image of the vehicle, it is necessary to calibrate the outputs of the image capture devices. Calibration values determined during calibration of the image capture devices are then used to correct subsequently captured image frames for offset of the image capture devices from ideal positions thereof, so that plan view images of the ground subsequently outputted for display with the plan view image of the vehicle are exact representations of the ground on respective opposite sides of the vehicle. Such calibration can be accurately carried out in a factory during production of the motor vehicle. Typically, the image capture devices are relatively accurately fitted in the side mirror housings of the motor vehicle, and by using suitable grid patterns on the ground, calibration can be effected. However, the environments in which motor vehicles must operate are generally relatively harsh environments, in that side mirror housings are vulnerable to impacts with other vehicles or stationary objects. While such impacts may not render the orientation of the side mirror housing unsuitable for producing an adequate rear view from a rear view mirror mounted therein, such impacts can and in general do result in the image capturing device mounted therein being knocked out of alignment, in other words, being offset from its ideal position. Additionally, where a vehicle is involved in a crash, or alternatively, where a side mirror housing requires replacement, re-calibration of the image capture device refitted in the new side mirror housing will be required. Such re-calibration, which typically would be carried out using a grid pattern on the ground, is unsatisfactory, since in general, it is impossible to accurately align the vehicle with the grid pattern in order to adequately calibrate the image capture device, unless the calibration is being carried out under factory conditions.

There is therefore a need for a method and a calibration system for calibrating an output of an image capture device mounted on a vehicle to compensate for offset of the image capture device from an ideal position which addresses these problems.

The present invention is directed towards such a method and a calibration system. The invention is also directed towards a method and an image vision system for producing an output image frame from a captured image frame captured by an image capture device with the output image frame with compensation for offset of the image capture device from an ideal position. The invention also relates to a vehicle comprising a calibration system for calibrating an output of an image capture device mounted on the vehicle to compensate for offset of the image capture device from an ideal position, and the invention further relates to a vehicle comprising an image capture device mounted thereon and an associated image vision system for producing an output image frame from a captured image frame captured by the image capture device with the output image frame with compensation for offset of the image capture device from an ideal position.

SUMMARY OF THE INVENTION

According to the invention there is provided a method for calibrating an output of an image capture device mounted on a vehicle to compensate for offset of the image capture device from an ideal position, the method comprising:
reading digital data representative of an image frame captured by the image capture device,
determining the actual position in the image frame of a reference element captured in the image frame,
determining an offset error value of the actual position of the reference element in the captured image frame from an ideal position of the reference element in a corresponding ideal image frame, and
producing an offset correction transformation function in response to the determined offset error value for correcting image frames subsequently captured by the image capture device to produce image frames with compensation for the offset of the image capture device.

Preferably, the offset error value is determined by comparing the actual position of the reference element in the captured image frame with the ideal position of the reference element in the corresponding ideal image frame. Advantageously, the offset correction transformation function is expressed as an N parameter function, where N is an integer value equal to one or greater.

In one embodiment of the invention the value of the integer N lies in the range of 2 to 7. Preferably, the value of the integer N lies in the range of 3 to 5.

In another embodiment of the invention the offset correction transformation function is expressed as an H order polynomial expression, where H is an integer value equal to one or greater. Preferably, the value of the integer H lies in the range of 1 to 6. Advantageously, the value of the integer H lies in the range of 2 to 5. Ideally, the value of the integer H lies in the range of 3 to 4.

In another embodiment of the invention the value of the integer H is less than the value of the integer N. Preferably, the value of the integer H is less than the value of the integer N by one.

In one embodiment of the invention the determined actual position of the reference element in the captured image frame is expressed as a function of Cartesian co-ordinates of the actual position of the reference element in the captured image frame, and the ideal position of the reference element in the corresponding ideal image frame is expressed as a function of Cartesian co-ordinates of the ideal position of the reference element in the corresponding ideal image frame.

Preferably, the offset correction transformation function is expressed as two polynomial expressions, one for each of the Cartesian co-ordinates.

Advantageously, an offset correction look-up table is produced from the offset correction transformation function for use in the reconstruction of image frames with compensation for the offset of the image capture device from captured image frames subsequently captured by the image capture device, and the offset correction look-up table is stored. Preferably, the offset correction look-up table indicates the positions at which at least some of the pixels in the subsequently captured image frames are to be located in the corresponding reconstructed images with compensation for the offset of the image capture device.

In one embodiment of the invention the offset correction transformation function is produced by computing the offset correction transformation function from the determined offset error value.

In an alternative embodiment of the invention the offset correction transformation function is produced by selecting the offset correction transformation function from one of a plurality of predefined offset correction transformation functions.

Preferably, the plurality of predefined offset correction transformation functions are cross-referenced with respective corresponding predefined offset error values.

Advantageously, the selected predefined offset correction transformation function is the predefined offset correction transformation function corresponding to the predefined offset error value, which is closest to the determined offset error value.

Ideally, the set of the plurality of predefined offset correction transformation functions with their respective corresponding predefined offset error values are stored in a transformation functions look-up table.

In one embodiment of the invention M offset error values are determined of the actual positions of the reference element in M captured image frames from the ideal positions of the reference element in M respective corresponding ideal image frames, where M is an integer value equal to one or greater. Preferably, the offset correction transformation function is produced from a predetermined one of the M offset error values. Advantageously, an additional offset correction transformation function is produced from at least one of the other M offset error values, the at least one offset correction transformation function or a function thereof being compared with the offset correction transformation function produced from the predetermined one of the M offset error values or a function thereof to confirm the offset correction transformation function produced from the predetermined one of the M offset error values.

In one embodiment of the invention at least two sets of respective pluralities of predefined offset correction transformation functions are cross-referenced with corresponding predefined offset error values of the actual positions of the reference element from the corresponding ideal positions thereof for the respective at least two of the M captured image frames.

Preferably, M sets of respective pluralities of predefined offset correction transformation functions are cross-referenced with corresponding predefined M offset error values of the actual positions of the reference element from the corresponding ideal positions thereof for the respective M captured image frames.

In one embodiment of the invention the respective sets of the pluralities of predefined offset correction transformation functions cross-referenced with corresponding predefined offset error values are stored in the transformation functions look-up table. Preferably, the respective M captured image frames from which the corresponding offset error values are determined of the positions of the reference element from the ideal positions thereof in the corresponding ideal image frames are captured from M respective different angles.

In one embodiment of the invention the value of the integer M is at least equal to the value of the integer N. Preferably, the value of the integer M is greater than the value of the integer N. Advantageously, the value of the integer M is greater than the value of the integer N by one.

In one embodiment of the invention one of the image capture device and the reference element is moved relative to the other for capturing the M image frames.

In another embodiment of the invention the image capture device is moved for sweeping the image capture device through M discrete positions for capturing the M image frames. Preferably, the image capture device is swivelled through the M discrete positions.

In one embodiment of the invention the image capture device is adapted for mounting on a moveable carrier means mounted on the vehicle, and the image capture device is moved through the M discrete positions by moving the carrier means. Preferably, the carrier means on which the image capture device is mounted is a side mirror housing extending sidewardly outwardly of the vehicle for housing a side rear view mirror, the side mirror housing being moveable between an operative position with the side mirror facing rearwardly, and a rest position with the side mirror housing extending adjacent a side of the vehicle, and the image capture device is moved through the M discrete positions thereof by swivelling the side mirror housing from one of the rest position and the operative position to the other of the rest position and the operative position.

In one embodiment of the invention at least two offset error values are determined of the actual position of respective reference elements from the ideal positions thereof, and at least one offset correction transformation function is produced from at least one of the determined offset error values.

In another embodiment of the invention sets of respective pluralities of predefined offset correction transformation functions are cross-referenced with corresponding predefined offset error values of the actual positions of at least two of the respective reference elements from the ideal positions thereof. Preferably, sets of respective pluralities of predefined offset correction transformation functions are cross-referenced with corresponding predefined offset error values of the actual positions of the respective reference elements from the ideal positions thereof.

Advantageously, each set of the plurality of predefined offset correction transformation functions cross-referenced with corresponding predefined offset error values is stored in the transformation functions look-up table.

In one embodiment of the invention the reference element is defined by a portion of the vehicle.

In another embodiment of the invention the reference element is defined by a portion of a window frame in a door of the vehicle adjacent the carrier means on which the image capture device is mounted.

In a still further embodiment of the invention the reference element is defined by a portion of the contact of a tyre of the vehicle with the ground.

Preferably, the reference element is defined by a reference point.

Advantageously, the reference element is defined by a pixel defining the reference point in the captured image frame.

In one embodiment of the invention the offset correction transformation function includes correction for distortion of the captured image frame resulting from fish-eye effect of a lens of the image capture device, and for perspective distortion.

In another embodiment of the invention the offset error value is determined from raw digital data representative of the captured image frame outputted by the image capture device.

In a further embodiment of the invention the method is adapted for use with a digital video camera.

Additionally the invention provides a calibration system for calibrating an output of an image capture device mounted on a vehicle to compensate for offset of the image capture device from an ideal position, the system comprising:
a reading means for reading digital data representative of an image frame captured by the image capture device,
a means for determining the actual position in the captured image frame of a reference element in the captured image frame,
a means for determining an offset error value of the actual position of the reference element in the captured image frame from an ideal position of the reference element in a corresponding ideal image frame, and
a means for producing an offset correction transformation function from the determined offset error value for correcting image frames subsequently captured by the image capture device to produce image frames with compensation for the offset of the image capture device.

In one embodiment of the invention the means for producing the offset correction transformation function produces the offset correction transformation function as an N parameter function, where N is an integer value equal to one or greater.

In another embodiment of the invention the means for producing the offset correction transformation function produces the offset correction transformation function as an H order polynomial expression, where H is an integer value equal to one or greater.

In another embodiment of the invention the means for determining the actual position of the reference element in the captured image frame expresses the actual position of the reference element as a function of Cartesian co-ordinates of the actual position of the reference element in the captured image frame, and the ideal position of the reference element in the corresponding ideal image frame is expressed as a function of Cartesian co-ordinates of the ideal position of the reference element in the corresponding ideal image frame.

In one embodiment of the invention the means for producing the offset correction transformation function produces the offset correction transformation function as two polynomial expressions, one for each of the Cartesian co-ordinates.

In an alternative embodiment of the invention a means is provided for producing an offset correction look-up table from the offset correction transformation function for use in the reconstruction of image frames with compensation for the offset of the image capture device from captured image frames subsequently captured by the image capture device, and a storing means is provided for storing the offset correction look-up table.

Preferably, the offset correction look-up table indicates the positions at which at least some of the pixels in the subsequently captured image frames are to be located in the corresponding reconstructed images with compensation for the offset of the image capture device.

In one embodiment of the invention the means for producing the offset correction transformation function comprises a computing means for computing the offset correction transformation function from the determined offset error value.

In another embodiment of the invention the means for producing the offset correction transformation function selects the offset correction transformation function from one of a plurality of predefined offset correction transformation functions.

In another embodiment of the invention the plurality of predefined offset correction transformation functions are stored in the storing means and cross-referenced with respective corresponding predefined offset error values.

Advantageously, the means for producing the predefined offset correction transformation function selects the predefined offset correction transformation function corresponding to the predefined offset error value, which is closest to the determined offset error value.

In one embodiment of the invention the set of the plurality of predefined offset correction transformation functions with their respective corresponding predefined offset error values are stored in the storing means in the form of a transformation functions look-up table.

Preferably, the means for determining the offset error value of the actual positions of the reference element from the ideal position thereof determines M offset error values of the actual position of the reference element from respective ideal positions thereof in M captured image frames, where M is an integer value equal to one or greater.

Advantageously, the means for producing the offset correction transformation function produces the offset correction transformation function from a predetermined one of the M offset error values.

Preferably, the means for producing the offset correction transformation functions produces an additional offset correction transformation function from at least one of the other M offset error values, and the means for producing the offset correction transformation function compares the at least one offset correction transformation function or a function thereof with the offset correction transformation function produced from the predetermined one of the M offset error values or a function thereof to confirm the offset correction transformation function produced from the predetermined one of the M offset error values.

In one embodiment of the invention at least two sets of respective pluralities of predefined offset correction transformation functions are cross-referenced with corresponding predefined offset error values of the actual positions of the reference element from the corresponding ideal positions thereof for the respective at least two of the M captured image frames.

Preferably, M sets of respective pluralities of predefined offset correction transformation functions are cross-referenced with corresponding predefined M offset error values of the actual positions of the reference element from the corresponding ideal positions thereof for the respective M captured image frames.

Advantageously, the respective sets of the pluralities of predefined offset correction transformation functions cross-referenced with corresponding predefined offset error values are stored in the transformation functions look-up table.

In another embodiment of the invention the respective M captured image frames from which the corresponding offset error values are determined of the positions of the reference element from the ideal positions thereof in the corresponding ideal image frames are captured from M respective different angles.

In one embodiment of the invention one of the image capture device and the reference element is moveably mounted relative to the other for capturing the M image frames. Preferably, the image capture device is moveably mounted for sweeping the image capture device through M discrete positions for capturing the M image frames. Advantageously, the image capture device is swivellably mounted for swivelling through the M discrete positions.

In one embodiment of the invention the image capture device is adapted for mounting on a moveable carrier means mounted on the vehicle, and the image capture device is moved through the M discrete positions by moving the carrier means.

In one embodiment of the invention the calibration system is adapted for use with a digital video camera.

In another embodiment of the invention the storing means comprises a read-only memory and a random access memory.

The invention also provides a method for sequentially producing a plurality of output image frames derived from respective corresponding captured image frames captured by an image capture device mounted on a vehicle with the output image frames including compensation for offset of the image capture device from an ideal position, the method comprising:

sequentially reading digital data representative of the respective captured image frames, determining appropriate locations at which at least some of the pixels in each captured image frame should be located in the corresponding output image frame based on predetermined calibration data to compensate for the offset of the image capture device, and constructing each output image frame with the pixels therein corresponding to the at least some of the pixels of the corresponding captured image frame located in the determined appropriate locations.

In one embodiment of the invention the predetermined calibration data comprises an offset correction look-up table.

In another embodiment of the invention the offset correction look-up table identifies the appropriate locations at which the at least some of the pixels of the captured image frames are to be located in the respective corresponding output image frames.

In a further embodiment of the invention the offset correction look-up table is derived from an offset correction transformation function derived during calibration of the output of the image capture device carried out using the method for calibrating according to the invention.

Preferably, the location at which the at least some of the pixels of the respective captured image frames are to be located in the respective corresponding output image frames is determined on the fly as the digital data representative of the respective pixels is being received.

Advantageously, the respective output image frames are sequentially outputted as a stream of digital data.

In one embodiment of the invention the image capture device is adapted for mounting on a motor vehicle.

In another embodiment of the invention the image capture device is adapted for mounting on a sidewardly projecting carrier means of the motor vehicle with the field of view of the image capture device directed substantially downwardly for capturing an image of the ground adjacent the side of the vehicle.

In a further embodiment of the invention the image capture device is adapted for mounting on a carrier means with the field of view of the image capture device directed substantially downwardly of the vehicle for capturing a view of the ground adjacent the vehicle to the rear thereof.

In one embodiment of the invention the output image frames are adapted for providing a visual image to a driver of the vehicle for assisting in manoeuvring the vehicle in a confined area.

The invention also provides an image vision system for sequentially producing a plurality of output image frames derived from corresponding captured image frames captured by an image capture device mounted on a vehicle with the output image frames including compensation for offset of the image capture device from an ideal position, the image vision system comprising a reading means for reading digital data representative of the respective captured image frames, a means for determining appropriate locations at which at least some of the pixels in each captured image frame should be located in the corresponding output image frame based on predetermined calibration data to compensate for the offset of the image capture device, and a means for constructing each output image frame with the pixels therein corresponding to at least some of the pixels of the corresponding captured image frame located in the determined appropriate locations.

Preferably, the predetermined calibration data is stored in the form of an offset correction look-up table.

Advantageously, the offset correction look-up table identifies the appropriate locations at which the at least some of the pixels of each captured image frame are to be located in the corresponding output image frame.

Advantageously, the offset correction look-up table is derived from an offset correction transformation function.

In one embodiment of the invention the offset correction transformation function from which the offset correction look-up table is derived is derived by the method for calibrating according to the invention.

In one embodiment of the invention a visual display screen responsive to the respective output image frames displays images derived from the output image frames.

In another embodiment of the invention the visual display screen is adapted for mounting in the field of view of a driver.

In another embodiment of the invention the image capture device is adapted for mounting on a carrier means of the vehicle.

In a further embodiment of the invention the image capture device is adapted for mounting on the carrier means of the vehicle with the field of view of the image capture device directed downwardly for capturing image frames of the ground adjacent the corresponding side of the vehicle.

In a still further embodiment of the invention the image capture device is adapted for mounting on the carrier means with the field of view of the image capture device directed downwardly of the vehicle for capturing image frames of the ground to the rear of the vehicle.

In one embodiment of the invention the image capture device is adapted for mounting on a carrier means located to the rear of the vehicle.

The invention further provides a vehicle comprising at least one image capture device mounted thereon, the output of the image capture device being calibrated according to the method according to the invention.

In one embodiment of the invention the image capture device is mounted on a carrier means, mounted on the vehicle.

In another embodiment of the invention the carrier means extends sidewardly from the vehicle, and the image capture device is mounted on the carrier means with the field of view of the image capture device directed downwardly for capturing image frames of the ground of the vehicle adjacent the corresponding side thereof.

In a further embodiment of the invention the carrier means comprises a side mirror housing, the side mirror housing being swivelable between an operative position with a mirror therein directed rearwardly, and a rest position with the mirror housing extending adjacent the vehicle.

Preferably, calibration of the output of the image capture device is carried out during a period when the side mirror housing is being urged between the respective rest and operative positions.

In one embodiment of the invention the calibration of the image capture device is carried out during a period when the side mirror housing is being urged from the rest position to the operative position.

In a further embodiment of the invention the carrier means is located to the rear of the vehicle, and the image capture device is mounted on the carrier means with the field of view of the image capture device being directed rearwardly for capturing an image of the ground to the rear of the vehicle.

In a still further embodiment of the invention the calibrating system according to the invention is provided for calibrating the image capture device to compensate for offset of the image capture device from an ideal position.

In another embodiment of the invention an image vision system according to the invention is provided for receiving digital data representative of respective image frames captured by the image capture device for producing corresponding output image frames with compensation for offset of the image capture device from an ideal position.

In one embodiment of the invention at least one image capture device is located to one side of the vehicle, and at least one image capture device is located to the rear of the vehicle.

In another embodiment of the invention a pair of image capture devices are provided on respective opposite sides of the vehicle.

ADVANTAGES OF THE INVENTION

The advantages of the invention are many. A particularly important advantage of the invention is that it provides relatively accurate calibration of the output of an image capture device without the need for special calibration grids and the like. This has the particularly important advantage that there is no need to accurately align the vehicle with a calibration grid or other external calibration devices or patterns.

Where the image capture device is mounted on a side mirror housing of the vehicle, and the side mirror housing is of the type which is swivelable from an operative position with the rear view mirror directed substantially rearwardly of the vehicle and a rest position extending substantially along and adjacent the vehicle, while the side rear view mirror housing is being swivelled from the rest position to the operative position, the output of the image capture device can be automatically calibrated. Since side mirror housings of such vehicles, in general, are swivelled from the rest to the operative position each time the ignition of a vehicle is activated, the output of the image capture device or devices are calibrated each time the ignition of the vehicle is activated if the calibration system is activated in response to activation of the ignition.

Where an image capture device is fixedly mounted on a vehicle, calibration can also be periodically carried out by merely putting the calibration system into a calibration mode.

Additionally, by virtue of the fact that calibration of the output of the image capture device or devices can be readily easily and frequently carried out, images outputted for display on a visual display screen can be readily easily produced with compensation for offset of the image capture device or devices from an ideal position. For example, where image capture devices are mounted to the sides of the vehicle with the field of view of the image capture devices directed downwardly in order to capture plan view images of the ground on respective opposite adjacent the side of the vehicle, after calibration by the method according to the invention, subsequent plan view images of the ground can be produced corrected for offset of the image capture device using calibration values derived during calibration, which are accurate representations of top plan views of the ground on respective opposite sides of the vehicle for display with a plan view image of the vehicle.

By producing the offset correction transformation function for each image capture device during calibration of the output of the image capture device, an offset correction look-up table can readily easily be produced from the offset correction transformation function, and the offset correction look-up table can indicate the locations at which at least some of the pixels of the captured image frame should be placed in a reconstructed image frame with compensation for offset of the image capture device from an ideal position thereof, for outputting to a visual display unit. A particularly important advantage of the invention is provided by producing the transformation function as a polynomial expression, and in particular, a polynomial expression of the second order or greater, since a polynomial expression is an efficient way of expressing and calculating a function, and the function can be made more or less accurate by adding or omitting terms, as the case may be.

BRIEF DESCRIPTION OF THE DRAWINGS

The invention will be more clearly understood from the following description of a preferred embodiment thereof, which is given by way of example only, with reference to the accompanying drawings, in which:

FIG. 9 is a tabular representation of an offset correction look-up table for use in the image vision system according to the invention.

DETAILED DESCRIPTION OF THE INVENTION

Figure 1:
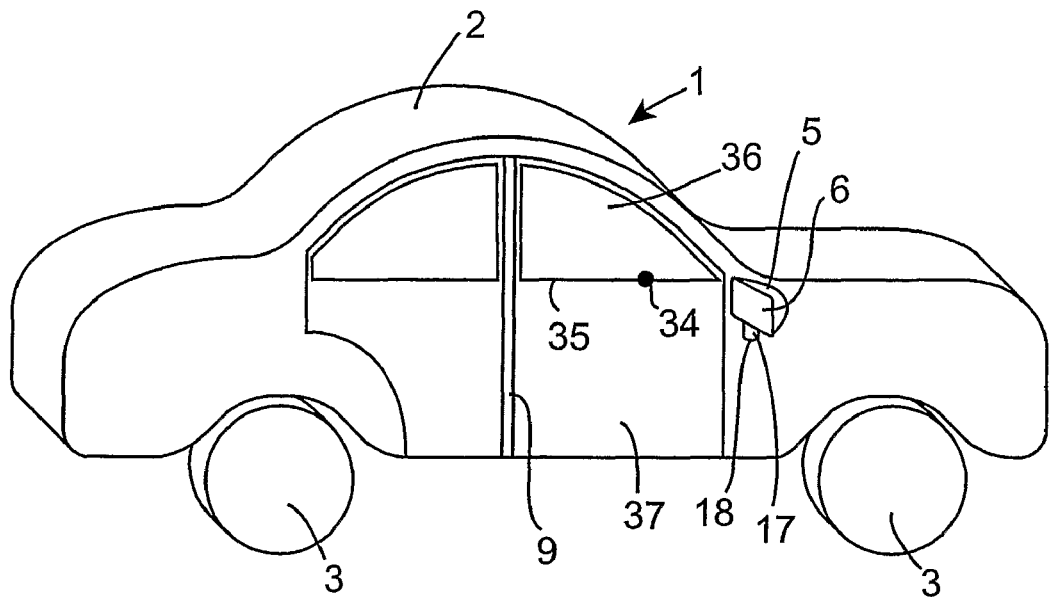
FIG. 1 is a schematic perspective view of a vehicle according to the invention.
Figure 2:
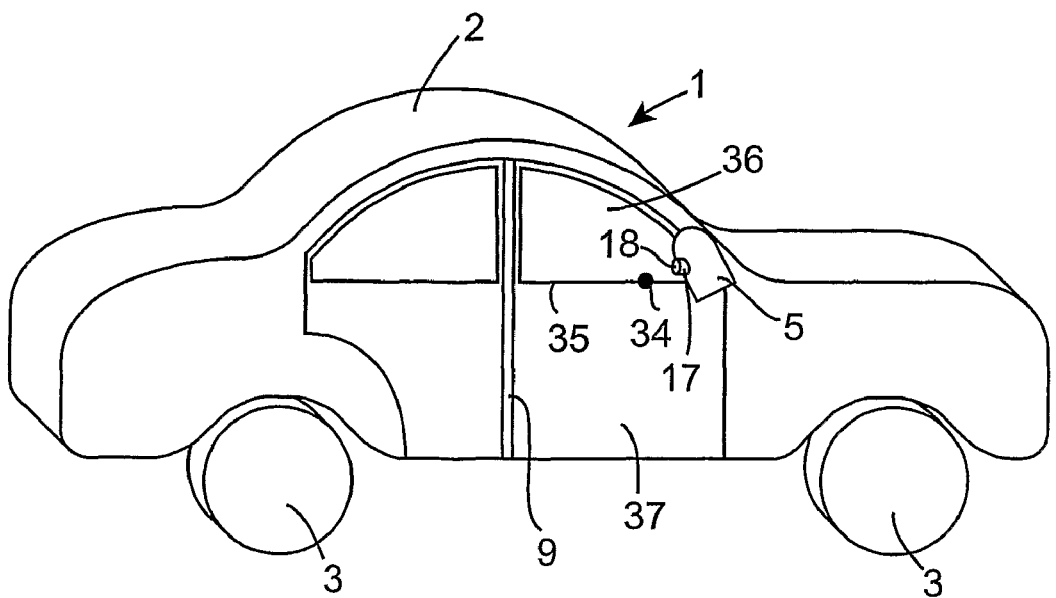
FIG. 2 is another schematic perspective view of the vehicle of FIG. 1 illustrating a portion of the vehicle in a different position.

Referring to the drawings and initially to FIGS. 1 and 2, there is illustrated a motor vehicle according to the invention, indicated generally by the reference numeral 1, which in this embodiment of the invention is a motor car, although needless to say, it will be appreciated that the motor vehicle may be any motor vehicle, for example, a van, a truck, a lorry, a bus or any other such vehicle. The motor vehicle 1 comprises a body 2 supported on four ground engaging wheels 3. Two side mirror housings 5 are provided on the motor vehicle 1, one side rear view mirror housing 5 extending from each side of the body 2 of the motor vehicle 1. A rear view mirror 6 is housed within each side mirror housing 5, and in this embodiment of the invention each side mirror housing 5 is swivelably mounted on the body 2 and is swivelable from an operative position illustrated in FIG. 1 with the side mirror housing 5 extending sidewardly outwardly of the vehicle and the rear view mirror 6 facing rearwardly of the vehicle 1, and a rest position illustrated in FIG. 2 with the side mirror housing 5 extending along and substantially adjacent a corresponding side 9 of the vehicle 1. Such swivelably mounted side mirror housings 5 will be well known to those skilled in the art, and the swivelling of the side mirror housings 5 may be carried out manually or automatically. In this embodiment of the invention the side mirror housings 5 are swivelable between the rest and the operative positions by respective servomotors 7, which is illustrated in block representation in FIG. 3. The servomotors 7 are mounted in the side mirror housing 5, and are operable for swivelling the side mirrors 5 between the rest and operative positions in response to the state of the ignition. When the ignition of the vehicle 1 is activated, the servomotors 7 are operated for swivelling the side mirror housings 5 from the rest to the operative position, and vice versa when the ignition of the vehicle 1 is deactivated. The construction of such side rear view mirror housings 5 and the swivelling of such side rear view mirror housings by servomotors in response to the state of the ignition system of a motor vehicle will be well known to those skilled in the art, and further description should not be required.

Figure 4:
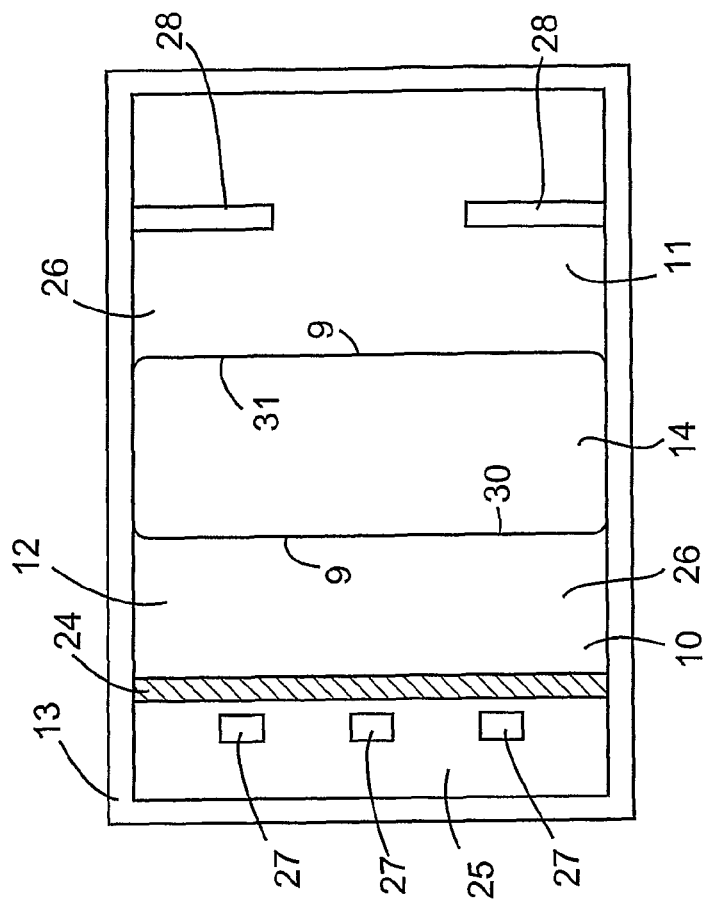
FIG. 4 is a view of a portion of the image vision system of FIG. 3, FIGS. 5(a) to (c) are diagrammatic representations of captured image frames captured by an image capture device of the image vision system of FIG. 3.
Figure 3:
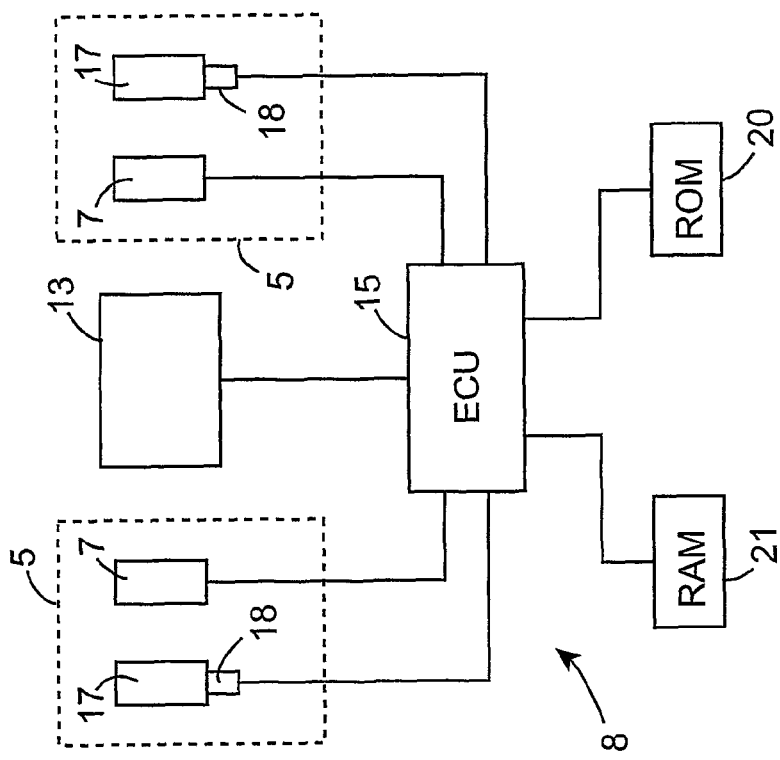
FIG. 3 is a block representation of an image vision system according to the invention for use in the vehicle of FIG. 1.

Referring additionally to FIGS. 3 and 4, an image vision system also according to the invention, indicated generally by the reference numeral 8, is located within the vehicle 1 for displaying plan view images 10 and 11 of the ground on respective opposite sides 9 of the vehicle 1 adjacent the vehicle on a visual display screen 12 of an in-vehicle visual display unit 13 juxtapositioned on opposite sides 9 of a plan view image 14 of the vehicle 1, for assisting a driver in parking the vehicle and manoeuvring the vehicle in a confined space. The visual display unit 13 may be incorporated in the dashboard of the vehicle 1 or may be mounted on the dashboard of the vehicle 1, or may be located in an area corresponding to a location generally occupied by an in-vehicle conventional rear view mirror.

The image vision system 8 comprises an electronic control unit 15 which is located within the vehicle 1 for controlling the operation of the image vision system 8, and for outputting image frames to the visual display unit 13 for display on the visual display screen 12 as will be described below. A pair of image capture devices, in this embodiment of the invention a pair of digital video cameras 17, of the image vision system 8 are mounted in the side mirror housings 5, one camera 17 being mounted in each side mirror housing 5. Lenses 18 of the respective cameras 17 project downwardly out of the side mirror housings 5 towards the ground, and the field of view of the respective cameras 17 is thus directed downwardly towards the ground for capturing image frames of plan views of the ground on the respective opposite sides of the vehicle 1. Digital data streams outputted by the respective cameras 17 which are representative of sequentially captured image frames which are captured by the respective cameras 17 are fed to the electronic control unit 15 for processing as will be described below prior to being outputted to the visual display unit 13.

A read-only memory 20 for storing computer programmes for controlling the operation of the electronic control unit 15 is provided, and the read-only memory 20 also stores a plan view image of the motor vehicle, which is read by the electronic control unit 15 for display on the visual display screen 12. The read-only memory 20 also stores calibration data as will be described below. A random access memory 21 is provided for storing data during processing of the captured image frames from the cameras 17, and also for storing calibration and other data. The read-only memory 20 and random access memory 21 may be provided separately of the electronic control unit 15 and coupled thereto for facilitating reading data from the read-only memory 20 and the random access memory 21, and for writing data to the random access memory 21, and/or may be incorporated on-board in the electronic control unit 15.

Signals which are indicative of the operational state of the servomotors 7 of the side mirror housings 5, and which are also indicative of the direction of operation of the servomotors 7 and the current positions of the side mirror housings 5 are fed from the servomotors 7 to the electronic control unit 15, so that the electronic control unit 15 can determine the operational state of the servomotors 7, and the direction in which the servomotors 7 are swivelling the side rear view mirror housings 5, as well as the current positions of the side mirror housings 5. These signals are required by the electronic control unit 15 for calibration of the outputs of the cameras 17 each time the servomotors 7 are operated in response to the ignition system of the vehicle 1 being activated for swivelling the side mirror housings 5 from the rest to the operative state, as will be described below, so that any offset in the positions of the cameras 17 from their ideal positions can be compensated for in subsequently captured image frames of the ground.

Before describing the calibration of the image vision system 8 and the processing of captured image frames from the cameras 17 in the electronic control unit 15 prior to being fed to the visual display unit 13, the reason as to why calibration of the outputs of the cameras 17 is required will first be described with reference to FIG. 4.

Referring in particular to FIG. 4, a typical screen of images which are displayed on the visual display screen 12 of the visual display unit 13 is illustrated. The plan view image 14 of the vehicle 1 is substantially centred on the visual display screen 12. The image 10 of the ground on the left-hand side of the vehicle 1 from the camera 17 on the left-hand side of the vehicle 1 is displayed on the left-hand side of the visual display screen 12, and the image 11 of the ground on the right-hand side of the vehicle 1 from the camera 17 on the right-hand side of the vehicle 1 is displayed on the right-hand side of the visual display screen 12. The plan view images 10 and 11 of the ground on the right- and left-hand side of the vehicle 1 which are displayed on the visual display screen 12 of FIG. 4 are typical of such right- and left-hand plan view images of the ground which would be displayed during a parking manoeuvre of the vehicle 1.

In the plan view image 10 of the ground on the left-hand side of the visual display screen 12, a kerb 24 of a footpath 25 is illustrated running alongside the road 26. Bollards 27 on the footpath 25 adjacent the kerb 24 are also illustrated in the plan view image 10 of the ground. In the plan view image 11 of the ground on the right-hand side of the vehicle during the same parking manoeuvre, the road 26 is also illustrated, along with road marking white lines 28 which appear on the road on the right-hand side of the vehicle 1.

In order that the driver can accurately estimate distances from the vehicle 1 to images of objects displayed in the images 10 and 11 on the visual display screen 12, for example, the distance of the vehicle 1 from the kerb 24, and from the bollards 27 on the footpath 25, it is essential that the images 10 and 11 displayed on the visual display screen 12 juxtapositioned with the plan view image 14 of the vehicle are exact or substantially exact representations of corresponding plan views of the ground on respective opposite sides of the vehicle 1 when viewed in plan from above the vehicle. In other words, it is essential that the edges 30 and 31 of the images 10 and 11, respectively, which run alongside the sides 9 of the image 14 of the vehicle 1 correspond exactly with corresponding boundary edges of the road on respective opposite sides of the vehicle 1 when the vehicle 1 and road are viewed in plan view from directly above the respective sides 9 of the vehicle 1. Otherwise, the driver could not accurately estimate the distance of the vehicle from objects displayed in the plan view images 10 and 11. For example, if the field of view of the camera 17 on the left-hand side of the vehicle 1 were directed slightly inwardly towards the vehicle, a portion of the road adjacent the edge 30 appearing in the plan view image 10 would actually be a portion of the road beneath the vehicle, and thus, the kerb 24 and the bollards 27 would appear to the driver to be further away from the vehicle than they actually were, which could have serious consequences during a parking manoeuvre of the vehicle.

Accordingly, in order to ensure that the plan view images 10 and 11 are accurate representations of the plan views of the ground on respective opposite sides 9 of the vehicle, any offsets of the positions of the cameras 17 from the ideal positions must be compensated for prior to displaying the images 10 and 11 on the screen 12. In order to provide for this compensation the outputs of the cameras 17 are calibrated each time the ignition system of the motor vehicle 1 is activated. Calibration of the outputs of each of the cameras 17 is similar, and is carried out substantially simultaneously. Accordingly, calibration of the camera 17 on the right-hand side of the vehicle 1 will be described in detail, calibration of the camera 17 on the left-hand side being identical.

In order to carry out calibration of the output of the right-hand camera 17, a reference element is identified on the vehicle which is within the field of view of the camera 17 as it is swivelled from the rest position to the operative position. In this embodiment of the invention the reference elements for both cameras 17 are respective reference points 34 which are located on a lower portion of frames 35 of windows 36 in front doors 37 of the vehicle 1 adjacent the corresponding one of the side mirror housings 5. In this embodiment of the invention the rate of capture of image frames by the respective cameras 17 is thirty image frames per second.

As the right-hand side mirror housing 5 is being swivelled from the rest to the operative position, M which in this embodiment of the invention is an integer of value equal to three of the captured images which are captured by the right-hand camera 17 are used in the calibration process. The M captured images are those which are captured at M, namely, three spaced apart locations of the camera 17 as the right-hand side mirror housing 5 is being swivelled from the rest position to the operative position while the reference point 34 is still within the field of view of the right-hand camera 17. The electronic control unit 15 reads the signals from the right-hand servomotor 7 for identifying when the side mirror housing 5 is at each of the respective M positions at which a captured image captured by the right-hand camera 17 is to be selected for use in the calibration process. As each captured image from the respective M positions of the right-hand camera 17 is received by the electronic control unit 15, the actual position of the reference point 34 in the captured image is determined by determining the Cartesian co-ordinates, namely, the X ordinate and the Y ordinate of the actual position of the reference point 34 in the captured image.

In FIGS. 5(a) to 5(c) three typical captured image frames 38 corresponding to the three positions of the right-hand camera 17 at which the three image frames are captured are illustrated showing the reference point 34 in the captured image frames 38. The actual position of the reference point 34 in each of the captured images 38 is compared with the ideal position of the reference point 34 in a corresponding ideal image frame if the right-hand camera 17 were accurately and correctly positioned in the right-hand side mirror housing 5 relative to the vehicle 1. In this case the right-hand camera 17 is offset from its ideal position. In FIGS. 5(a) to 5(c) the ideal position of the reference point 34 and a portion of the frame 35 are illustrated in broken lines and are identified by the reference numerals 34a and 35a. By comparing the actual position of the reference point 34 with the ideal position of the reference point 34a, the offset of the right-hand camera 17 from its correct ideal position can be determined. In this embodiment of the invention an offset error value of the offset of the actual position of the reference point 34 from the ideal position of the reference point 34a for each of the M captured images is computed using the X-Y co-ordinates of the actual and ideal positions of the reference point 34 and 34a, respectively, in each captured image frame of the M captured image frames.

Once a predetermined one of the offset error values of the actual position of the reference point 34 from the ideal position 34a, which in this embodiment of the invention is the first of the offset error values to be determined, has been determined, an offset correction transformation function, which will be described in detail below, is produced based on the first offset error value for applying to subsequently captured image frames from the right-hand camera 17 during normal operation of the image vision system 8. Offset correction transformation functions are subsequently and sequentially produced based on the other two offset error values of the M offset error values as the remaining two offset error values are sequentially determined. The first to be determined of the three offset correction transformation functions is compared with the second and third offset correction transformation functions to confirm the first offset correction transformation function. If the first offset correction transformation function compares favourably with the second and third offset correction transformation functions, the first offset correction transformation function is confirmed. Otherwise, the first to be determined of the three offset correction transformation functions is not confirmed. In general, if the first offset correction transformation function is not confirmed, calibration does not continue, since it would be deemed that the offset of the right-hand camera is such that calibration would be impossible. In such an event, an error message indicating that calibration of the camera is impossible and that the right-hand camera is unserviceable is displayed on the screen 12 of the visual display unit 13.

Once the first of the M offset correction transformation functions has been confirmed, an offset correction look-up table is then prepared from the offset correction transformation function and is stored in the random access memory 21. The offset correction look-up table which is prepared from the first offset correction transformation function also includes correction for distortion in the image frames resulting from fish-eye effect of the lens 18 of the right-hand camera 17 and for perspective so that lines which should be parallel appear parallel in the displayed plan view image 10. The correction for distortion resulting from fish-eye effect of the lens 18 and perspective of the right-hand camera 17 is carried out at factory calibration, and such calibration will be known to those skilled in the art. Calibration values for distortion resulting from fish-eye effect and perspective are incorporated in the offset correction look-up table as it is being prepared from the first offset correction transformation function. The offset correction look-up table indicates the location at which each pixel from each subsequently captured image frame from the right-hand camera 17 should be placed in a reconstructed image reconstructed from the captured image frame for outputting to the visual display unit 13 during normal operation of the image vision system 8. The format of an offset correction look-up table is described below with reference to FIG. 9.

Continuing to consider the right-hand camera 17 only, and turning now to the offset correction transformation functions which are produced from the M offset error values, each offset correction transformation function is expressed as two H order transformation functions, which in this embodiment of the invention are third order transformation functions, one of which is a third order polynomial expression for the X ordinates of the pixels, and the other is a third order polynomial expression for the Y ordinates of the pixels. Each polynomial expression comprises N parameters, which in this embodiment of the invention is four parameters, namely, the parameters "$a_x$", "$b_x$", "$c_x$" and "$d_x$" for the polynomial expression for the X ordinates, and "$a_y$", "$b_y$", "$c_y$" and "$d_y$" for the polynomial expression for the Y ordinates. Thus, the polynomial expression for the X ordinates of the pixels is an expression in the form of:

$$X_c = a_x + b_x x + c_x x^2 + d_x x^3 \tag{1}$$

where $X_c$ is the value of the X ordinate of the location at which a pixel is to be placed in a reconstructed image frame corrected for offset of the right-hand camera 17, and x is the value of the X ordinate of that pixel in the captured image frame from which the reconstructed image frame is being constructed.

The polynomial expression for the Y ordinates is an expression in the form of:

$$Y_c = a_y + b_y y + c_y y^2 + d_y y^3 \tag{2}$$

where $Y_c$ is the value of the Y ordinate of the location at which a pixel is to be placed in a reconstructed image frame corrected for offset of the right-hand camera 17, and y is the value of the Y ordinate of that pixel in the captured image frame from which the reconstructed image frame is being constructed.

Figures 5, 8:
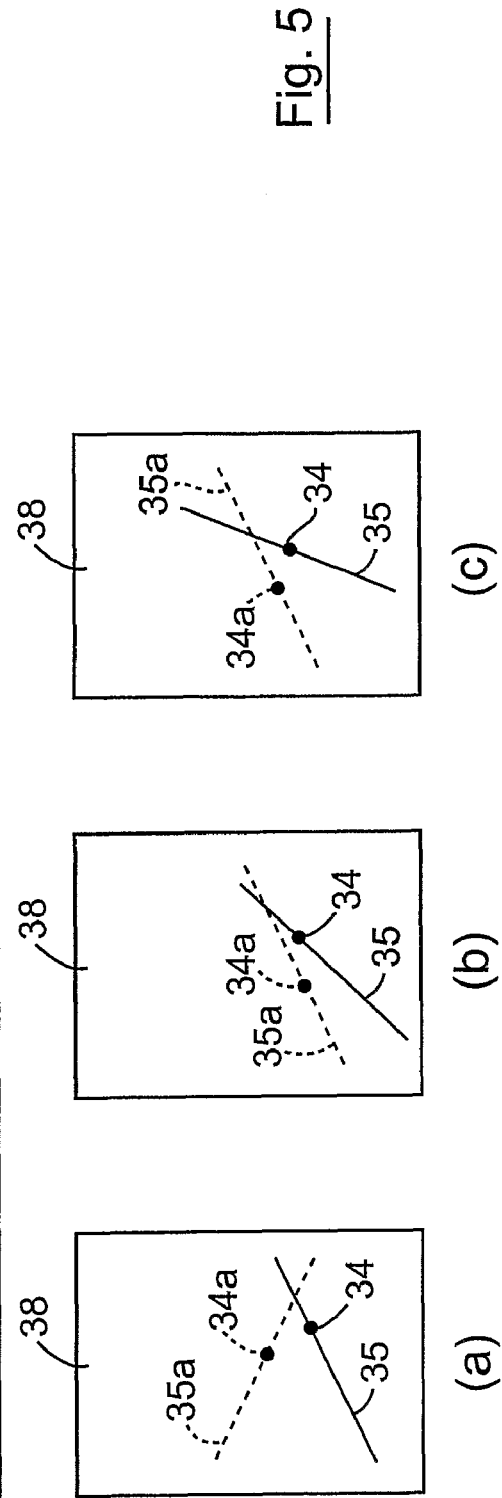
FIG. 8 is a tabular representation of a transformation functions look-up table for use in a calibration system also according to the invention.

Since the computation of such polynomial expressions for the X and Y co-ordinates of the pixels for correction thereof from an offset error value is a relatively complex computation, values of the parameters "$a_x$", "$b_x$", "$c_x$" and "$d_x$", and "$a_y$", "$b_y$", "$c_y$" and "$d_y$" for the X and Y polynomial expressions are predefined for predefined offset error values, and a plurality of the predefined parameters "$a_x$", "$b_x$", "$c_x$" and "$d_x$", and "$a_y$", "$b_y$", "$c_y$" and "$d_y$" are stored in a transformation functions look-up table in the read-only memory 20 cross-referenced with corresponding predefined offset error values for each of the M positions of the right-hand camera 17 at which the respective M image frames are captured. The predefined parameters "$a_x$", "$b_x$", "$c_x$" and "$d_x$", and "$a_y$", "$b_y$", "$c_y$" and "$d_y$" and the corresponding offset error values for the right-hand camera 17 are determined during factory calibration and stored in the read-only memory 20. The format of a transformation functions look-up table for the first of the M positions of the right-hand camera 17 at which the first of the M image frames is captured is illustrated in FIG. 8. The values of the predefined parameters "$a_x$", "$b_x$", "$c_x$" and "$d_x$" and "$a_y$", "$b_y$", "$c_y$" and "$d_y$" which are determined at factory calibration for the corresponding predefined offset error values are stored in the grid table against the corresponding predefined offset error values. Similar look-up tables for the second and third positions of the right-hand camera 17 are also prepared at factory calibration.

When the first offset error value has been determined for the right-hand camera 17, the set of stored predefined values of "$a_x$", "$b_x$", "$c_x$" and "$d_x$", and "$a_y$", "$b_y$", "$c_y$" and "$d_y$" which correspond to the predefined offset error value for the first position of the right-hand camera 17, which is closest to the determined first offset error value is selected from the transformation functions look-up table. On selection of the values of "$a_x$", "$b_x$", "$c_x$" and "$d_x$", and "$a_y$", "$b_y$", "$c_y$" and "$d_y$" the X and Y polynomial expressions (1) and (2) above are produced from the first image frame captured by the right-hand camera 17 in the first position thereof. Production of the X and Y polynomial expressions (1) and (2) from the second and third image frames captured by the right-hand camera 17 is similar to that just described, with the exception that the parameters "$a_x$", "$b_x$", "$c_x$" and "$d_x$", and "$a_y$", "$b_y$", "$c_y$" and "$d_y$" for the X and Y polynomial expressions for the second and third positions of the right-hand camera 17 are selected from the respective sets of the parameters "$a_x$", "$b_x$", "$c_x$" and "$d_x$", and "$a_y$", "$b_y$", "$c_y$" and "$d_y$" which are stored in the transformation functions look-up table against corresponding predefined offset error values for the second and third positions of the right-hand camera 17.

Figure 9:
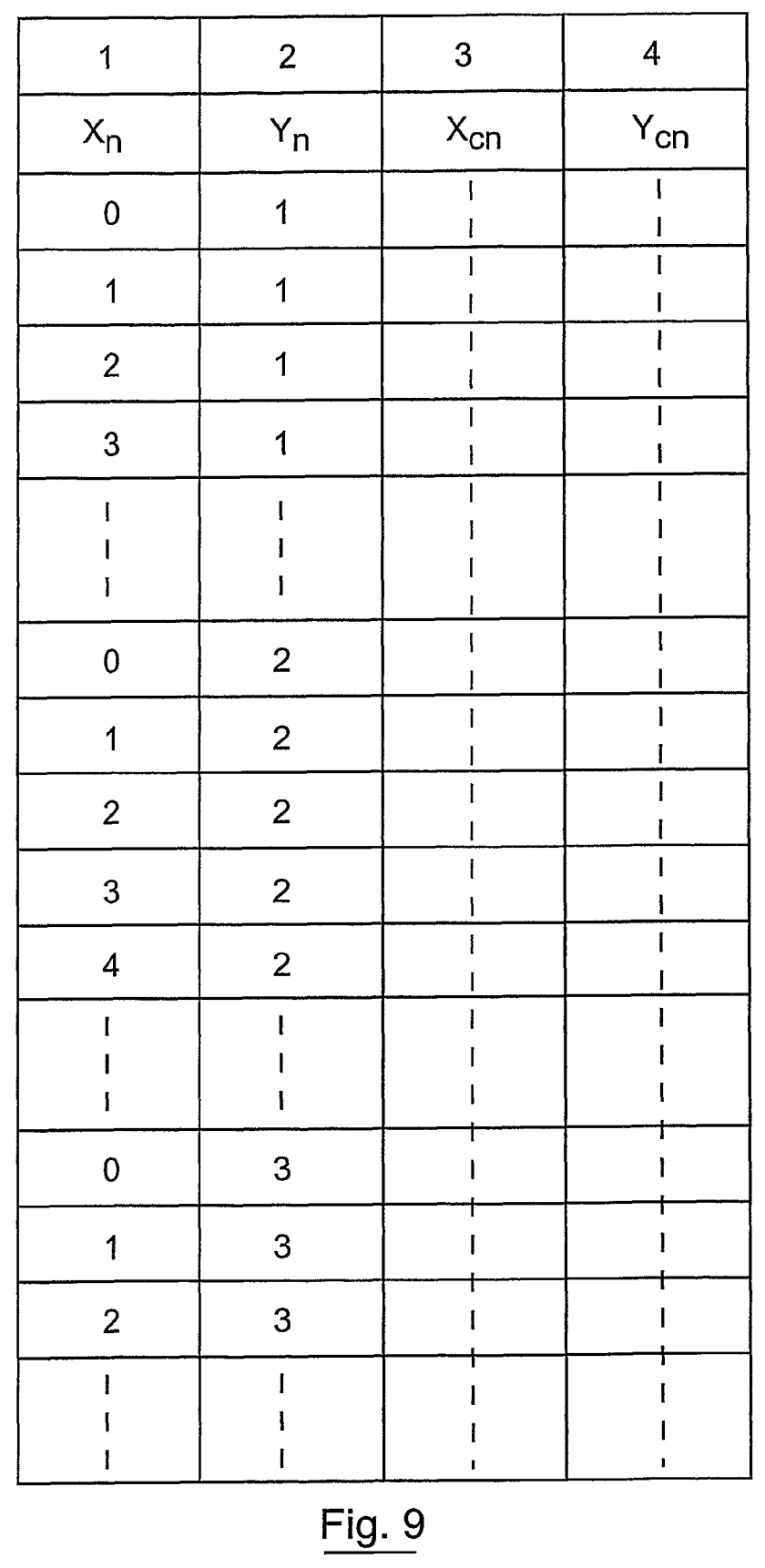

On preparation of the X and Y polynomial expressions for the three positions of the right-hand camera 17, the X and Y polynomial expressions for the first position of the right-hand camera 17 are compared sequentially with the X and Y polynomial expressions for the second and third positions of the right-hand camera 17. If the X and Y polynomial expressions for the first position of the right-hand camera 17 compare favourably with those for the respective second and third positions thereof, the X and Y polynomial expressions for the first position of the right-hand camera 17 are confirmed. Thereafter the offset correction look-up table which indicates the locations in which the pixels from captured image frames subsequently captured by the right-hand camera 17 should be placed in the corresponding reconstructed image frames to be outputted to the visual display unit 13 is prepared from the confirmed X and Y polynomial expressions of the first offset correction transformation function. Preparation of such an offset correction look-up table using the third order X and Y polynomial expressions of equations (1) and (2) will be well known to those skilled in the art. A portion of an offset correction look-up table is illustrated in FIG. 9. The corrected X and Y co-ordinates, namely, the co-ordinates $X_c$ and $Y_c$ at which the pixels are to be placed in the reconstructed image frame, which is to be outputted to the visual display unit 13, are set out in the columns 3 and 4 of the offset correction look-up table of FIG. 8 cross-referenced against the X and Y co-ordinates in columns 1 and 2 of the look-up table, $X_n$ and $Y_n$ of the pixels of the captured image frame from which the reconstructed image frame is being constructed.

As discussed above, if the X and Y polynomial expressions for the first position of the right-hand camera 17 do not compare favourably with either one or both of the X and Y polynomial expressions for the second and third positions of the right-hand camera 17, the error message is displayed on the visual display screen 12.

Preparation of corresponding X and Y polynomial expressions, and a corresponding offset correction look-up table for the left-hand camera 17 is identical to that described for the right-hand camera 17, with the exception that a separate transformation functions look-up table is stored in the read-only memory 20 for the left-hand camera 17 containing sets of the predefined parameters "$a_x$", "$b_x$", "$c_x$" and "$d_x$", and "$a_y$", "$b_y$", "$c_y$" and "$d_y$" cross-referenced with corresponding predefined offset error values for the corresponding M positions of the left-hand camera 17, which are also computed and stored during factory calibration of the left-hand camera 17.

Figure 6A:
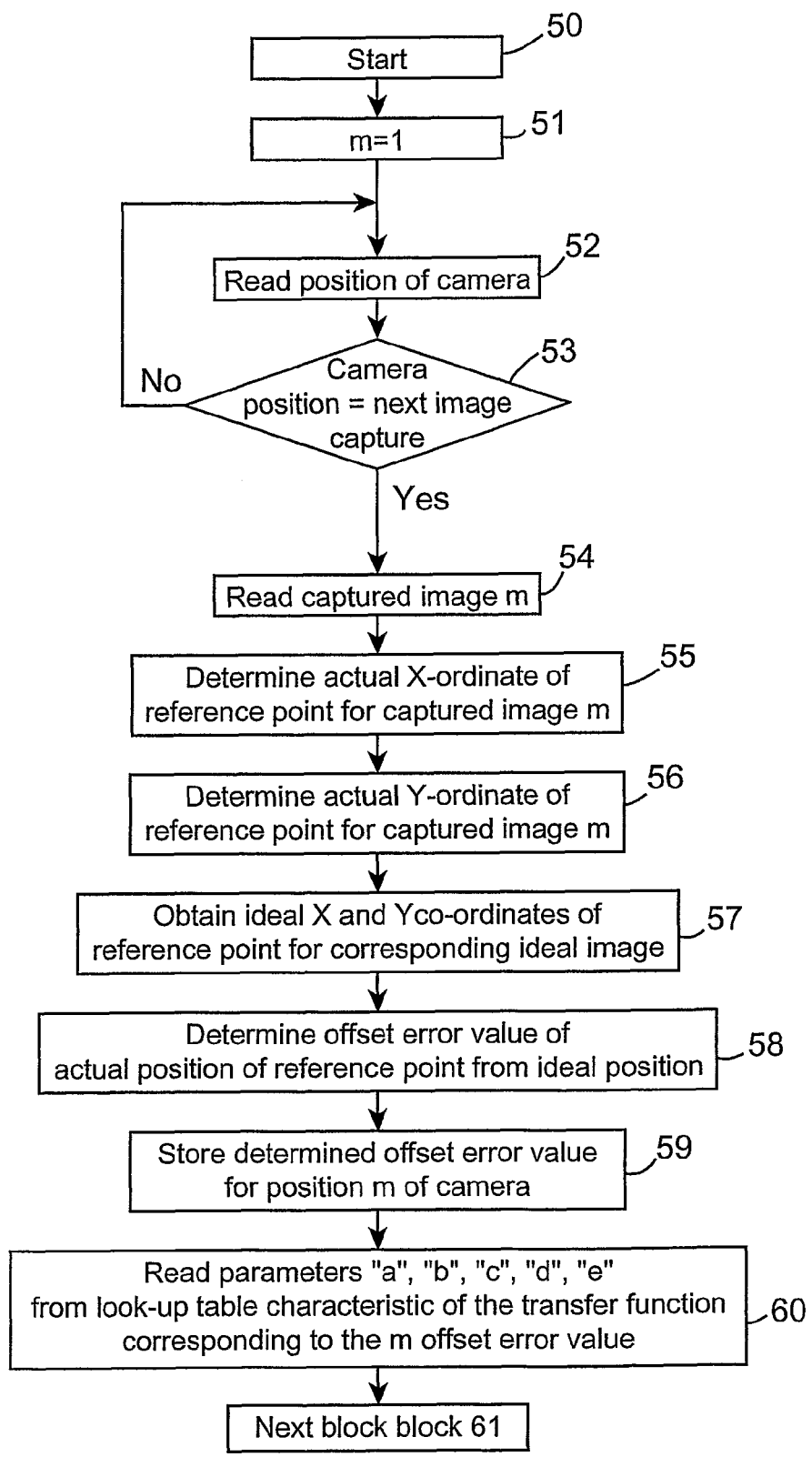
FIGS. 6(a) and (b) are illustrations of a flow chart of a subroutine of a computer programme for controlling the image vision system during calibration of an output of an image capture device of the image vision system of FIG. 3.
Figure 6B:
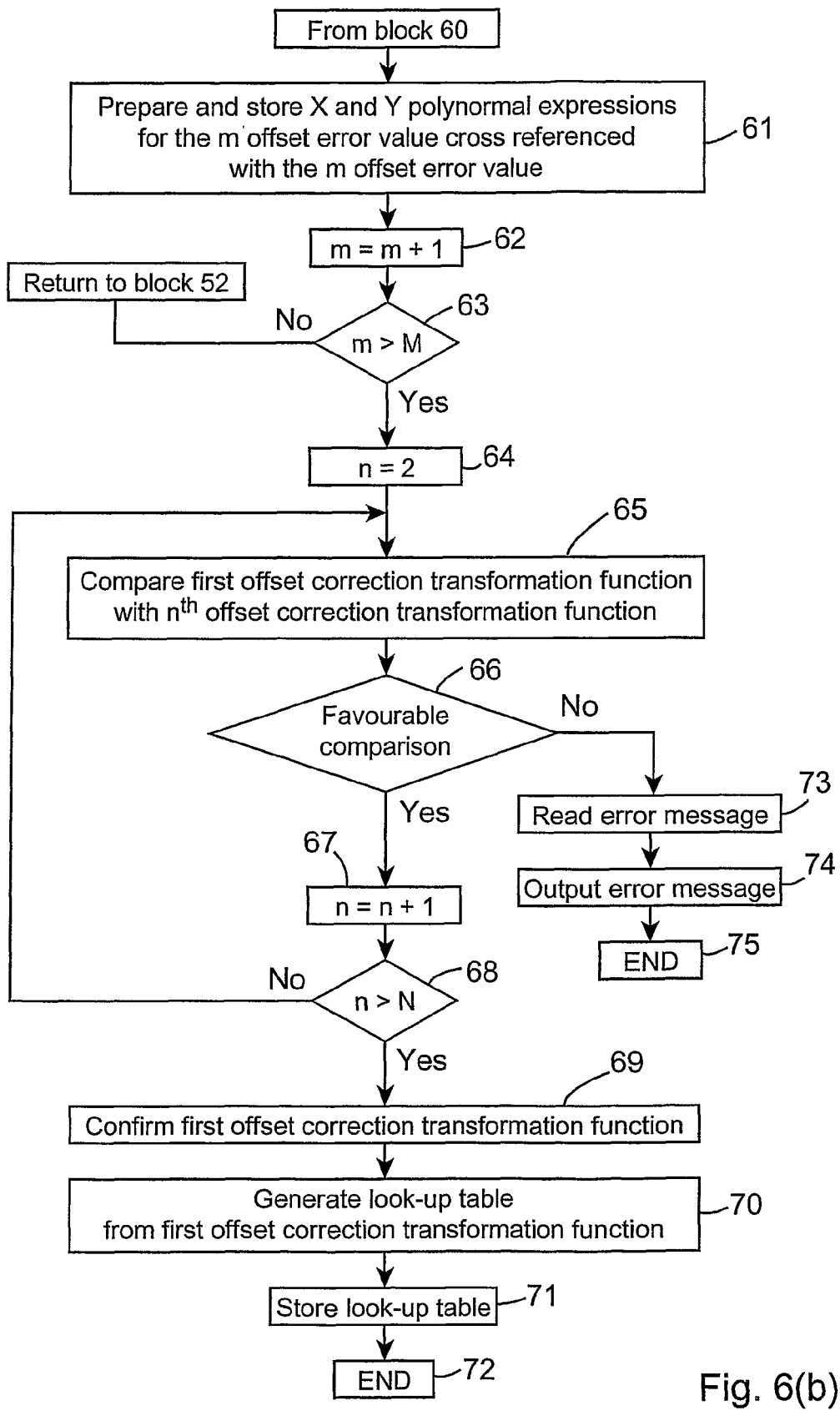

Turning now to FIGS. 6(*a*) and 6(*b*), a flowchart is illustrated of a subroutine of a computer programme under which the electronic control unit 15 operates in carrying out the calibration method for calibrating the output of the right-hand camera 17, which will now be described. Block 50 commences the subroutine and is activated in response to the servomotor 7 of the right-hand side mirror housing 5 being activated to urge the right-hand side mirror housing 5 from the rest to the operative positions. The subroutine then moves to block 51, which sets m equal to one. The subroutine then moves to block 52, which reads the position of the right-hand camera 17. The position of the right-hand camera 17 is determined by the electronic control unit 15 from signals from the servomotor 7 of the right-hand side mirror housing 5. The subroutine on reading the position of the right-hand camera 17 moves to block 53, which checks if the just read position of the right-hand camera 17 corresponds to the next one of the M positions, namely, the next one of the three positions of the right-hand camera 17 at which the next of the captured image frames is to be selected for the calibration process. If the right-hand camera 17 has not yet reached the next of the M positions, the subroutine returns to block 52. When block 53 determines that the position of the right-hand camera 17 corresponds with the next position of the M positions, the subroutine moves to block 54. Block 54 reads the captured image frame from the right-hand camera 17 which is the captured image frame m of the M captured image frames to be captured. The subroutine then moves to block 55, which determines the X ordinate of the actual position of the reference point 34 in the captured image frame m, and the subroutine moves to block 56. Block 56 determines the Y ordinate of the actual position of the reference point 34 in the captured image frame m.

On the X and Y co-ordinates of the actual position of the reference point 34 being determined, the subroutine moves to block 57. Block 57 obtains the X and Y co-ordinates of the ideal position of the reference point 34*a* for the corresponding ideal image frame which corresponds to the m captured image frame. The ideal X and Y co-ordinates of the reference point 34*a* for the corresponding M ideal image frames are determined at factory calibration and are stored in the read-only memory 20. The subroutine having obtained the X and Y co-ordinates of the ideal position of the reference point 34*a* for the corresponding m ideal image frame, moves to block 58. Block 58 computes the offset error value of the actual position of the reference point 34 from the ideal position thereof for the m captured image frame. The subroutine then moves to block 59, which stores the computed offset error value for the m captured image frame which corresponds to the m position of the right-hand camera 17 in the random access memory 21. The subroutine then moves to block 60, which reads the values of the predefined parameters "$a_x$", "$b_x$", "$c_x$" and "$d_x$" as well as "$a_y$", "$b_y$", "$c_y$" and "$d_y$" from the transformation functions look-up table stored in the read-only memory 20 which corresponds to the predefined offset error value which is closest to the determined m offset error value. On reading the corresponding parameters "$a_x$", "$b_x$", "$c_x$" and "$d_x$" and "$a_y$", "$b_y$", "$c_y$" and "$d_y$" from the transformation functions look-up table, the subroutine then moves to block 61, which prepares the X and Y polynomial expressions (1) and (2) for the m offset correction value, and stores the X and Y polynomial expressions in the random access memory 21 cross-referenced with the m offset correction value. The subroutine then moves to block 62, which increments m by one and the subroutine moves to block 63. Block 63 checks if m is greater than M, and if not, the subroutine is returned to block 52 to capture the next captured image frame from the right-hand camera 17 when the right-hand camera 17 is in the next m position of the M positions thereof. If block 63 determines that m is greater than M, thus indicating that the M, namely, the three image frames at the three positions of the right-hand camera 17 have been captured, and that the X and Y polynomial expressions of the first, second and third offset correction transformation functions for the three positions of the right-hand camera 17 have prepared, the subroutine moves to block 64.

Blocks 64 to 68 form a routine which sequentially compares the X and Y polynomial expressions of the first offset correction transformation function for the first offset correction value for the first position of the right-hand camera 17 with the X and Y polynomial expressions of the second and third offset correction transformation functions for the second and third offset error values of the second and third positions of the right-hand camera 17, respectively. Block 64 sets n equal to 2, and the subroutine moves to block 65. Block 65 compares the X and Y polynomial expressions of the first offset correction transformation function with the X and Y polynomial expressions of the n offset correction transformation function, and the subroutine moves to block 66. Block 66 checks if the X and Y polynomial expressions of the first offset correction transformation function compare favourably with the X and Y polynomial expressions of the n offset correction transformation function, and if so, the subroutine moves to block 67. Block 67 increments n by one, and the subroutine moves to block 68, which checks if n is greater than N. In this embodiment of the invention the value of N is pre-set in the read-only memory to be equal to three, since the X and Y polynomial expressions of the first offset correction transformation function are to be compared with the X and Y polynomial expressions of the second and third offset correction transformation functions. If block 68 determines that n is not greater than N, the subroutine returns to block 65, which compares the X and Y polynomial expressions of the first offset correction transformation function with the X and Y polynomial expressions of the third offset correction transformation function. On the other hand, if block 68 determines that n is greater than N, the subroutine moves to block 69. Block 69 confirms the X and Y polynomial expressions of the first offset correction transformation function, and the subroutine moves to block 70.

Block 70 prepares the offset correction look-up table from the X and Y polynomial expressions of the first offset correction transformation function, and the subroutine then moves to block 71 which stores the offset correction look-up table in the random access memory 21. The subroutine then moves to block 72, which returns control of the electronic control unit 15 to the main programme which controls the electronic control unit 15.

In the event of block 66 determining that the X and Y polynomial expressions of the first correction transformation function do not compare favourably with X and Y polynomial expressions of either one of the second and third offset correction transformation functions, thus indicating that the offset of the right-hand camera 17 from the ideal position is such that calibration of the camera is not possible, the subroutine moves to block 73, which reads an error message stored in the read-only memory 20 to indicate to the driver that the right-hand camera 17 on the right-hand side of the vehicle is unserviceable, and the subroutine then moves to block 74, which outputs the error message for display on the display screen 12 of the visual display unit 13. The subroutine then moves to block 75, which returns control of the electronic control unit 15 to the main computer programme.

As mentioned above, calibration of the output of the left-hand cameras 17 is similar to calibration of the output of the right-hand camera 17, and is substantially simultaneously carried out with calibration of the output of the right-hand camera 17, and thus, the offset correction look-up tables are prepared by the subroutine of FIG. 6 are prepared and stored in the random access memory 21 for the respective left-hand and right-hand cameras 17.

Figure 7:
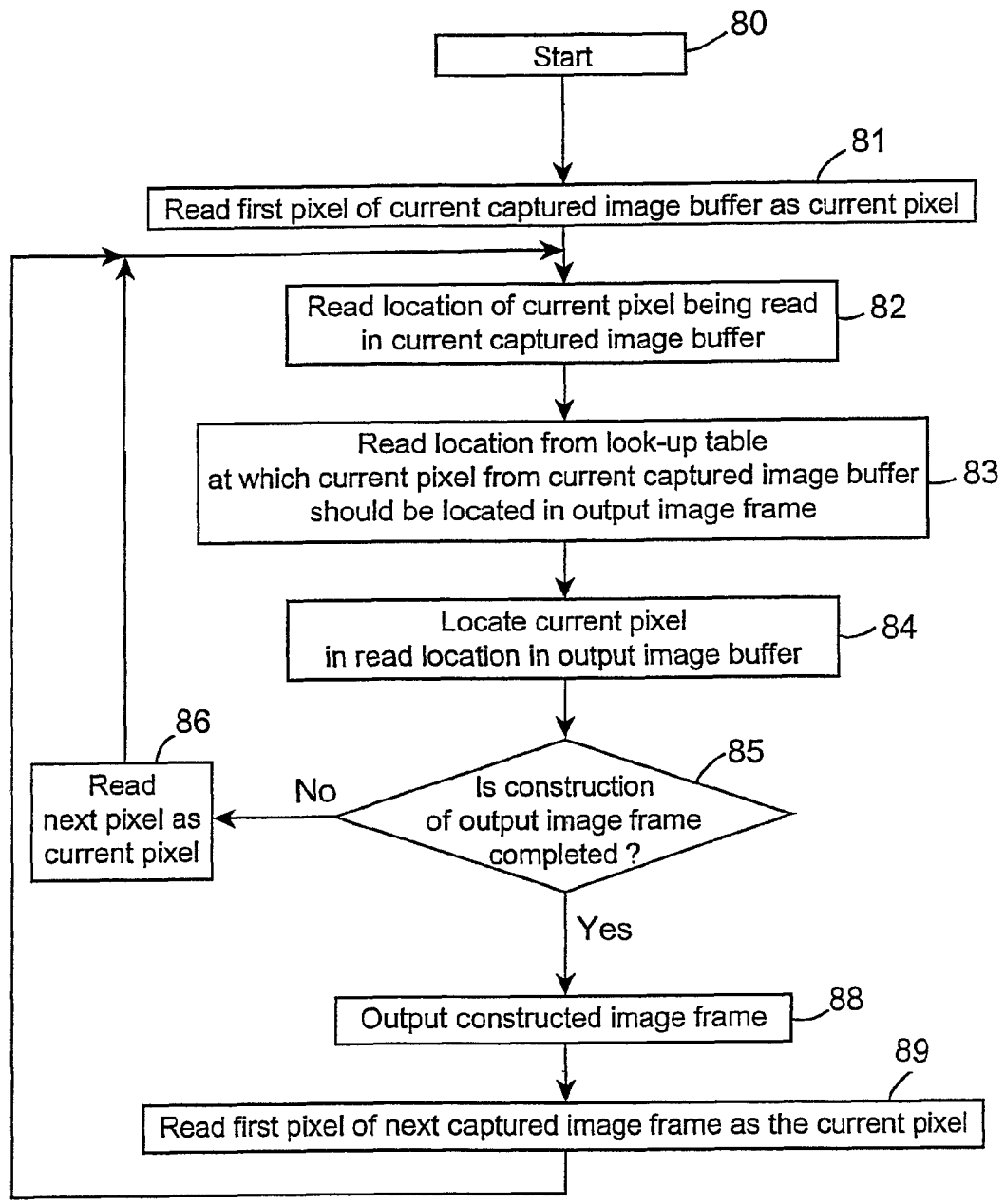
FIG. 7 is a flowchart of a subroutine of a computer programme under which the image vision system operates for displaying images on a visual display unit of the image vision system of FIG. 3 from image capture devices of the image vision system of FIG. 3.

Referring now to FIG. 7, a flowchart is illustrated of a subroutine of a computer programme under which the electronic control unit 15 operates during normal operation of the image vision system 8 for producing output image frames for outputting to the visual display unit 13 for displaying the right-hand image 11 displayed on the visual display screen 12, so that the displayed images 10 and 11 are corrected for offset of the cameras 17. The operation of the electronic control circuit 15 under the subroutine of FIG. 7 is similar for the left- and right-hand cameras 17, and for convenience the application of the subroutine to digital signals received from the right-hand camera 17 will be described, the application of the subroutine to digital signals received from the left-hand camera 17 being identical. Block 80 starts the subroutine, and the subroutine moves to block 81. Block 81 reads the current pixel being received from buffered digital signals received from the right-hand camera 17 as the current pixel. The subroutine then moves to block 82, which reads the location of the current pixel being read from the buffered digital signal in the current image frame being captured by the right-hand camera 17. The subroutine then moves to block 83, which reads the location from the offset correction look-up table at which the current pixel of the image frame currently being captured should be located in a reconstructed image frame to form the output image frame to be outputted to the visual display unit 13 to produce the right-hand image 11.

The subroutine then moves to block 84, which locates the current pixel in the read location in the output image frame. The subroutine then moves to block 85, which checks if the construction of the output image frame which is to produce the right-hand image 11 in the visual display screen 12 has been completed. If not, the subroutine moves to block 86, which reads the next pixel from the buffered digital signal from the right-hand camera 17 as the current pixel, and returns to block 82.

When block 85 determines that the construction of the output image frame from which the right-hand image 11 is to be produced has been completed, the subroutine moves to block 88. Block 88 outputs the constructed output image frame for relaying to the visual display unit 13, as will be described below. The subroutine then moves to block 89, which reads the next pixel of the buffered digital signal from the right-hand camera 17, and returns the subroutine to block 82.

The electronic control unit 15 similarly and simultaneously prepares a reconstructed output image frame from the buffered digital signal simultaneously received from the left-hand camera 17. Under the control of a subroutine (not shown) the electronic control unit 15 reads the plan view image 14 of the vehicle 1 from the read-only memory 20, and combines the two reconstructed right-hand and left-hand output image frames with the read plan view image 14 of the vehicle 1, and outputs the combined frame to the visual display unit 13 for display on the screen 12 thereof.

As mentioned above, the cameras 17 each capture thirty image frames per second, and thus, thirty total combined image frames are outputted by the electronic control unit 15 to the visual display unit 13 per second with a slight delay which is less than one image frame.

In use, each time the ignition system of the vehicle 1 is activated, the left-hand and right-hand side mirror housings 5 are swivelled from the rest to the operating positions, and during the swivel movement from the rest to the operating positions, calibration of the outputs of the left- and right-hand cameras 17 is carried out. Thus, any offsetting of the left-hand and/or right-hand cameras 17 from their respective ideal positions relative to the vehicle 1 since the previous activation of the ignition system of the vehicle 1 is accounted for during the calibration process. Once the left-hand and right-hand side rear view mirror housings 5 have been swivelled into their respective operative positions, calibration of the outputs of the left- and right-hand cameras 17 is completed. Thus, when a driver wishes to park or manoeuvre the vehicle 1 in a confined space, the driver can select the image vision system 8 and on selection, the electronic control unit 15 outputs the combined image frames with compensation for offset of the cameras 17 from their respective ideal positions. The combined image frame may be outputted in either digital or analogue form as appropriate to the visual display unit 13 where the left- and right-hand plan view images 10 and 11 of the ground on respective opposite sides of the vehicle 1 and the plan view image 14 of the vehicle are displayed on the visual display screen 12, thereby facilitating parking and manoeuvring of the vehicle by the driver into a parking space or in a confined space, as the case may be.

The following is a brief explanation of the theory on which the derivation of the offset correction transformation function is based and the theory behind the derivation of the offset correction look-up table therefrom, for applying in real time to digital data representative of image frames sequentially captured by each camera 17 for correcting the image frames.

The following describes a calibration method for an image vision system with regard to continuous transformations of the captured image to compensate for distortion resulting from fish-eye effect for wide angled lens and perspective effects.

Let X be a video input image space. This is the image that the camera delivers to the video processing electronic control unit.

Let Y be a video output image space. This is part or all of what the vehicle occupant sees on the vehicle's display screen.

Because of wide angled fish-eye effects and perspective effects, the square grid presented to the camera will be contained in X so that the line segments of the grid are neither straight nor evenly spaced. However, it is possible to transform the images to recover the grid.

Let $P=\{T_i:X\rightarrow Y\}$ be an arbitrarily indexed family of transformations on X, that compensate for the lens position and lens distortion to give a view.

For a given camera that is correctly mounted in a predetermined home position with respect to a calibration grid containing regular square gridding, there exists $T_k$ s.t. Y is a subset of $T_k(X)$ and Y contains recovered regular square gridding.

Let $Q=\{T_j\}$ which is a subset of P be a family of transformations local to $T_k$ in the sense that if $(x_i,y_i)$ is an element of X then $T_j(x_i,y_i)$ is not distant from $T_k(x_i,y_i)$ as viewed on the vehicle's display screen by the vehicle occupant. A definite quantitative value for the locality requirement can be predetermined for a particular product family by measurement during product development prior to the use of any of the algorithms discussed below.

For a particular camera, consider a known datum on the body of each vehicle which is in the field of view of a camera mounted on the side mirror housing of the vehicle. The movement of the side mirror housing of the vehicle is used to ensure that a suitable datum is in the field of view of the camera, although it is not necessary to the function of the algorithm if there is a suitable datum in the field of view of the camera when the camera is fixed.

Let $(x_d,y_d)$ which is an element of X be the expected position of this datum. Let $(x_{dm},y_{dm})$ which is an element of X be the measured actual position of this datum. It may be the case that due to either stacked tolerances in the insertion of the camera into the housing, or to the side mirror housing being knocked, $(x_{dm},y_{dm})\neq(x_d,y_d)$.

If the following axiom is demonstrated to be appropriate to the vehicle then the method will work well.

For perturbations of the position of the camera in the side mirror housing that are attributable to reasonable causes such as tolerances of the side mirror housing or a post-production fit of a camera and for each $(x_{dm},y_{dm})\neq(x_d,y_d)$ but local to each other, there exists $T_m$ is an element such that $T_m(x)$ recovers the square gridding in X.

If $T_k$ is known for a particular camera, then for each $(x_{dm},y_{dm})\neq(x_d,y_d)$ an appropriate transformation can be recovered using previously measured values predetermined by actual measurement in the laboratory. All that would be required is that the appropriate correct transformation is determined, either by measurement of a camera with transfer function $T_k$ during predevelopment or by calculation.

Let U which is a subset of X be the set of usable datum point co-ordinates. If the system looks for a reference point and it is either absent or outside of this set, then the system knows that the side mirror housing has been knocked excessively off line and an error message can be sent to the vehicle.

By the axiom, for a given camera there exists a function $F: U\rightarrow Q$.

Let $\{a_{pi}\}$ be coefficients of a polynomial expansion of $T_p$ in the ordinates of X.

This leads us to our procedures for calibration in the factory.

1) At calibration in the factory, mount the camera in front of a regularised square grid whose position relative to the camera is the same as the position of the camera in the home position on the vehicle would be to the ground.
2) Calculate $T_k$ by a fast method such as perturbations on a likely predetermined transformation in the factory. The perturbations would probably be equivalent to functions in Q. The appropriate transformation would be the one that recovers the straightest lines and the most evenly spaced squares. As a metric can be applied to this, a best transformation can be found.
3) Store the coefficients $\{a_{ki}\}$ for the transformation. These may be used to generate a look-up table representation of $T_k$ which will allow $T_k$ to be applied in real-time to the streamed digital video inputs.
4) Store the coefficients $W=\{\{a_{qi}\}: T_q$ is an element of $Q\}$
5) Store the pairs $V=\{(a,b): a$ as an element of $U, b=F(a)$ as an element of $Q\}$ The procedure on the vehicle during the periodic calibration would then be 1) Measure $(x_{dm}, y_{dm})$ of the desired datum on the vehicle.
2) Use $(x_{dm}, y_{dm})$ to determine the new transformation $T_q$ as an element of Q appropriate to the deviation that caused $(x_{dm}, y_{dm}) \neq (x_d, y_d)$ using V.

Apply the new transformation $T_q$ as an element of Q by regenerating a new offset look-up table that allows it to be used in real-time. This can be done numerically using the expression of $T_q$ as an element of Q stored in W.

While the offset correction transformation function has been described as being expressed as two third order polynomial expressions representative of the X and Y co-ordinates, it will be readily appreciated that the expressions may be polynomial expressions of any order from one upwards. It will also be appreciated that the number of parameters of each polynomial expression may vary, and in general, will be one more than the order of the polynomial expression. Further, it will be appreciated that other transformation functions besides polynomial expressions may be used for compensating for the offset error value resulting from offset of one or both of the cameras of the image vision system.

It will also be appreciated that instead of producing a look-up table from the offset correction transformation function for each camera, the offset correction transformation functions may be applied directly to the digital data stream from the respective cameras, although the computation required in applying the transformation functions directly to the digital data streams from the respective cameras would be considerably greater than that required for determining the appropriate positions of the pixels in the output image frames from the respective corresponding offset correction look-up tables. It is also envisaged that instead of retrieving the parameters of the polynomial expressions from stored parameters which are stored against corresponding predefined sets of offset error values, the parameters of the polynomial expressions may be computed directly from the determined offset error values.

Indeed, it is envisaged that instead of storing the parameters of the respective polynomial expressions individually, the parameters could be stored in any other suitable fashion, for example, for the polynomial expression $$f(x) = a + bx + cx^2 + dx^3,$$

the polynomial expression could be stored as follows:
p=a
q=x
p=p+bq (which is a+bx)
q=qx
p=p+cq (which is $a+bx+cx^2$)
q=qx
p=p+dq (which is $a+bx+cx^2+dx^3$)

While the method and system have been described for use in side mounted downwardly directed cameras, it will be readily apparent to those skilled in the art that the calibration method and the image vision system may be applied to cameras mounted on the vehicle and directed in any desired direction, for example, rearwardly directed cameras for producing panoramic rear views of the environment exterior of the vehicle, sidewardly directed cameras and indeed, forwardly directed cameras.

While the calibration method and system have been described as requiring M captured images at M different positions of the camera to be used during calibration, it is envisaged that in certain cases a single captured image frame may be sufficient for calibrating each camera. In which case, calibration would be carried out based on the offset error value determined from one captured image. Thus, the calibration method and system according to the invention may be used for cameras which are fixedly mounted on a motor vehicle, as opposed to those which are mounted on a side mirror housing which is swivelable between a rest position and an operative position. Additionally, it is envisaged that where the camera is a fixed camera, the calibration of the camera could be carried out by identifying more than one reference element, for example, two or three reference elements, which may be reference points on the vehicle or related to the vehicle, but which would be fixed reference points at known locations relative to the vehicle. In which case, during calibration the offset error value of the actual position of each reference point or reference element from the respective ideal positions thereof would be determined, and corresponding offset correction transformation functions would be produced for each offset error value of the respective actual positions of the reference points from their respective ideal positions. The offset correction transformation function of one of the reference points would then be compared with the transformation functions of the other reference points for confirmation of the said one of the offset correction transformation function, and if the said one of the offset correction transformation function compared favourably with the other one, two or more offset correction transformation functions, then the said one offset correction transformation function would be confirmed, and an appropriate offset correction look-up table would be prepared therefrom.

While the cameras have been described as being digital video cameras, the cameras may be analogue video cameras, which would output an analogue signal representative of the captured image frames, however, the analogue signals representative of the captured image frames would initially have to be converted into digital data and then fed to the electronic control unit. Indeed, it is envisaged that an appropriate analogue-to-digital converter could be located in the electronic control unit, or provided associated therewith for converting the analogue signals representative of the image frames captured by the camera to a digital data stream. It will also be appreciated that the output image frames outputted by the electronic control unit to the visual display unit may be in digital or analogue form, depending on the type of visual display unit. However, where the output image frames are to be outputted in analogue form, a suitable digital-to-analogue converter may be incorporated in the electronic control unit, or associated therewith for converting the output image frames in digital form to analogue form for relaying to the visual display unit.

It is also envisaged that the calibration method and system according to the invention may be used for calibrating a rearwardly directed camera which would be mounted to the rear of the vehicle for capturing a plan view image of the ground adjacent the rear of the vehicle for simultaneously display on the display screen of the visual display unit along with the top plan view image 14 of the vehicle and the left- and right-hand plan view images 10 and 11 of the ground on the respective left- and right-hand sides of the vehicle. In which case, if the rear view camera were fixedly mounted on the vehicle, calibration would be carried out based on a single captured image frame from the rear mounted camera, and the calibration would be carried out periodically, and if the rear view camera were used in conjunction with side cameras mounted on left- and right-hand side mirror housings of the vehicle, calibration of the rear view camera could be carried out simultaneously with calibration of the side cameras. It is also envisaged that the rear view camera could be mounted on a carrier means which would be mounted to the rear of the vehicle, and which would incorporate a swivel mechanism for the camera which would facilitate swivelling of the camera during calibration, so that a plurality of image frames, for example, M image frames would be captured for use in the calibration of the rear mounted camera. Alternatively, the camera may be fixed, and one or more offset error values could be determined of the actual position of one or more reference points from their respective ideal positions, from which one or more offset correction transformation functions could be produced as already discussed.

Additionally, it is envisaged that the cameras instead of being mounted in swivelably mounted left-hand and right-hand side mirror housings, the camera may be mounted in fixed side rear view mirror housings, or may be mounted on dedicated carriers extending from the sides of the vehicle. In which case, if the carriers were fixedly mounted to the vehicle, and the cameras were fixedly mounted to the carriers or on fixed side mirror housings, as the case may be, then calibration of the output of the cameras would be carried out on a single captured image frame.

Additionally, where the cameras for producing plan view images of the ground adjacent respective opposite sides of the vehicle are mounted on a dedicated carrier means, the carrier means could incorporate a swivel mechanism for swivelling the cameras during calibration.

While the reference element has been described as being a reference point located on a frame of the window of the adjacent door of the vehicle, any suitable reference element or reference point may be used. Indeed, it is envisaged that a point of contact of a tyre of an adjacent wheel of the vehicle with the ground could be used as a reference point, as could any other point on the vehicle, wheel or tyre of the vehicle. However, the reference point would have to be a point which would in general be fixed relative to the vehicle.

Additionally, while the calibration of the cameras has been described as being carried out during swivelling of the side mirror housings from the rest to the operative position, it will be appreciated that the calibration may be carried out as the side mirror housings are being swivelled from the operative to the rest position.

While the image capture devices have been described as being digital video cameras, the image capture devices may be provided by any other suitable image capture devices, for example, analogue video cameras or the like.

The invention claimed is:

1. A method for calibrating an output of an image capture device mounted on a vehicle to compensate for offset of the image capture device from an ideal position, the method comprising:
    reading digital data representative of an image frame captured by the image capture device,
    determining the actual position in the image frame of a reference element captured in the image frame,
    determining an offset error value of the actual position of the reference element in the captured image frame from an ideal position of the reference element in a corresponding ideal image frame, and
    producing an offset correction transformation function in response to the determined offset error value for correcting image frames subsequently captured by the image capture device to produce image frames with compensation for the offset of the image capture device.

2. A method as claimed in claim 1 in which the offset error value is determined by comparing the actual position of the reference element in the captured image frame with the ideal position of the reference element in the corresponding ideal image frame.

3. A method as claimed in claim 1 in which the offset correction transformation function is expressed as an N parameter function and as an H order polynomial expression, where N is an integer value equal to one or greater, and H is an integer value equal to one or greater.

4. A method as claimed in claim 3 in which the determined actual position of the reference element in the captured image frame is expressed as a function of Cartesian co-ordinates of the actual position of the reference element in the captured image frame, and the ideal position of the reference element in the corresponding ideal image frame is expressed as a function of Cartesian co-ordinates of the ideal position of the reference element in the corresponding ideal image frame, and preferably the offset correction transformation function is expressed as two polynomial expressions, one for each of the Cartesian co-ordinates.

5. A method as claimed in claim 3 in which an offset correction look-up table is produced from the offset correction transformation function for use in the reconstruction of image frames with compensation for the offset of the image capture device from captured image frames subsequently captured by the image capture device, and the offset correction look-up table is stored.

6. A method as claimed in claim 1 in which M offset error values are determined of the actual positions of the reference element in M captured image frames from the ideal positions of the reference element in M respective corresponding ideal image frames, where M is an integer value equal to one or greater, and preferably the offset correction transformation function is produced from a predetermined one of the M offset error values.

7. A method as claimed in claim 6 in which the respective M captured image frames from which the corresponding offset error values are determined of the positions of the reference element from the ideal positions thereof in the corresponding ideal image frames are captured from M respective different angles.

8. A method as claimed in claim 6 in which the image capture device is adapted for mounting on a moveable carrier means mounted on the vehicle, and the image capture device is moved through the M discrete positions by moving the carrier means.

9. A method as claimed in claim 6 in which one of the image capture device and the reference element is moved relative to the other for capturing the M image frames.

10. A method as claimed in claim 1 in which the reference element is defined by a portion of the vehicle.

11. A method as claimed in claim 1 in which the reference element is defined by a reference point, which is defined by a pixel in the captured image frame.

12. A vehicle comprising at least one image capture device mounted thereon, the output of the image capture device being calibrated according to the method as claimed in claim 1.

13. A calibration system for calibrating an output of an image capture device mounted on a vehicle to compensate for offset of the image capture device from an ideal position, the system comprising:
    a reading means for reading digital data representative of an image frame captured by the image capture device,
    a means for determining the actual position in the captured image frame of a reference element in the captured image frame,
    a means for determining an offset error value of the actual position of the reference element in the captured image frame from an ideal position of the reference element in a corresponding ideal image frame, and a means for producing an offset correction transformation function from the determined offset error value for correcting image frames subsequently captured by the image capture device to produce image frames with compensation for the offset of the image capture device.

14. A calibration system as claimed in claim 13 in which the means for producing the offset correction transformation function produces the offset correction transformation function as an N parameter function and as an H order polynomial expression, where N is an integer value equal to one or greater, and H is an integer value equal to one or greater.

15. A calibration system as claimed in claim 14 in which the means for determining the actual position of the reference element in the captured image frame expresses the actual position of the reference element as a function of Cartesian co-ordinates of the actual position of the reference element in the captured image frame, and the ideal position of the reference element in the corresponding ideal image frame is expressed as a function of Cartesian co-ordinates of the ideal position of the reference element in the corresponding ideal image frame, and the means for producing the offset correction transformation function produces the offset correction transformation function as two polynomial expressions, one for each of the Cartesian co-ordinates.

16. A calibration system as claimed in claim 13 in which the means for determining the offset error value of the actual positions of the reference element from the ideal position thereof determines M offset error values of the actual position of the reference element from respective ideal positions thereof in M captured image frames, where M is an integer value equal to one or greater, and preferably the means for producing the offset correction transformation function produces the offset correction transformation function from a predetermined one of the M offset error values.

17. A calibration system as claimed in claim 16 in which one of the image capture device and the reference element is moveably mounted relative to the other for capturing the M image frames.

18. A calibration system as claimed in claim 16 in which the image capture device is adapted for mounting on a moveable carrier means mounted on the vehicle, and the image capture device is moved through the M discrete positions by moving the carrier means.

19. A calibration system as claimed in claim 13 in which the reference element is defined by a reference point, which is defined by a pixel in the captured image frame.

20. A method for sequentially producing a plurality of output image frames derived from respective corresponding captured image frames captured by an image capture device mounted on a vehicle with the output image frames including compensation for offset of the image capture device from an ideal position, the method comprising:
   sequentially reading digital data representative of the respective captured image frames,
   determining appropriate locations at which at least some of the pixels in each captured image frame should be located in the corresponding output image frame based on calibration data to compensate for the offset of the image capture device, and
   constructing each output image frame with the pixels therein corresponding to the at least some of the pixels of the corresponding captured image frame located in the determined appropriate locations,
   the calibration data being derived from a method for calibrating the image capture device comprising:
   reading digital data representative of an image frame captured by the image capture device,
   determining the actual position in the image frame of a reference element captured in the image frame,
   determining an offset error value of the actual position of the reference element in the captured image frame from an ideal position of the reference element in a corresponding ideal image frame, and
   producing an offset correction transformation function in response to the determined offset error value for correcting image frames subsequently captured by the image capture device to produce image frames with compensation for the offset of the image capture device.

21. A method as claimed in claim 20 in which the calibration data comprises an offset correction look-up table derived from the offset correction transformation function, and the offset correction look-up table identifies the appropriate locations at which the at least some of the pixels of the captured image frames are to be located in the respective corresponding output image frames.

22. A method as claimed in claim 20 in which the location at which the at least some of the pixels of the respective captured image frames are to be located in the respective corresponding output image frames is determined on the fly as the digital data representative of the respective pixels is being received.

23. An image vision system for sequentially producing a plurality of output image frames derived from corresponding captured image frames captured by an image capture device mounted on a vehicle with the output image frames including compensation for offset of the image capture device from an ideal position, the image vision system comprising a reading means for reading digital data representative of the respective captured image frames, a means for determining appropriate locations at which at least some of the pixels in each captured image frame should be located in the corresponding output image frame based on calibration data to compensate for the offset of the image capture device, and a means for constructing each output image frame with the pixels therein corresponding to at least some of the pixels of the corresponding captured image frame located in the determined appropriate locations, the calibration data being derived from a method for calibrating the image capture device, the method comprising:
   reading digital data representative of an image frame captured by the image capture device,
   determining the actual position in the image frame of a reference element captured in the image frame,
   determining an offset error value of the actual position of the reference element in the captured image frame from an ideal position of the reference element in a corresponding ideal image frame, and
   producing an offset correction transformation function in response to the determined offset error value for correcting image frames subsequently captured by the image capture device to produce image frames with compensation for the offset of the image capture device.

24. An image vision system as claimed in claim 23 in which the predetermined calibration data is stored in the form of an offset correction look-up table, and the offset correction look-up table identifies the appropriate locations at which the at least some of the pixels of each captured image frame are to be located in the corresponding output image frame.

25. An image vision system as claimed in claim 23 in which a visual display screen responsive to the respective output image frames displays images derived from the output image frames, the visual display screen being adapted for mounting in the field of view of a driver, and the image capture device is adapted for mounting on a carrier means of the vehicle.

* * * * *

UNITED STATES PATENT AND TRADEMARK OFFICE
CERTIFICATE OF CORRECTION

PATENT NO. : 7,949,486 B2
APPLICATION NO. : 12/091636
DATED : May 24, 2011
INVENTOR(S) : Patrick Eoghan Denny, Tycho Lorenz Roland Raab and Lloyd Anthony Sharman It is certified that error appears in the above-identified patent and that said Letters Patent is hereby corrected as shown below:

In the Claims

At column 26, claim number 4, line number 14, "and preferably the offset correction transformation function" should read --and the offset correction transformation function--.

At column 26, claim number 6, line number 29, "greater, and preferably the offset correction transformation" should read --greater, and the offset correction transformation--.

At column 27, claim number 16, line number 31, "value equal to one or greater, and preferably the means for" should read --value equal to one or greater, and the means for--.

Signed and Sealed this
Ninth Day of September, 2014

Michelle K. Lee
*Deputy Director of the United States Patent and Trademark Office*